United States Patent Office 3,454,067
Patented July 8, 1969

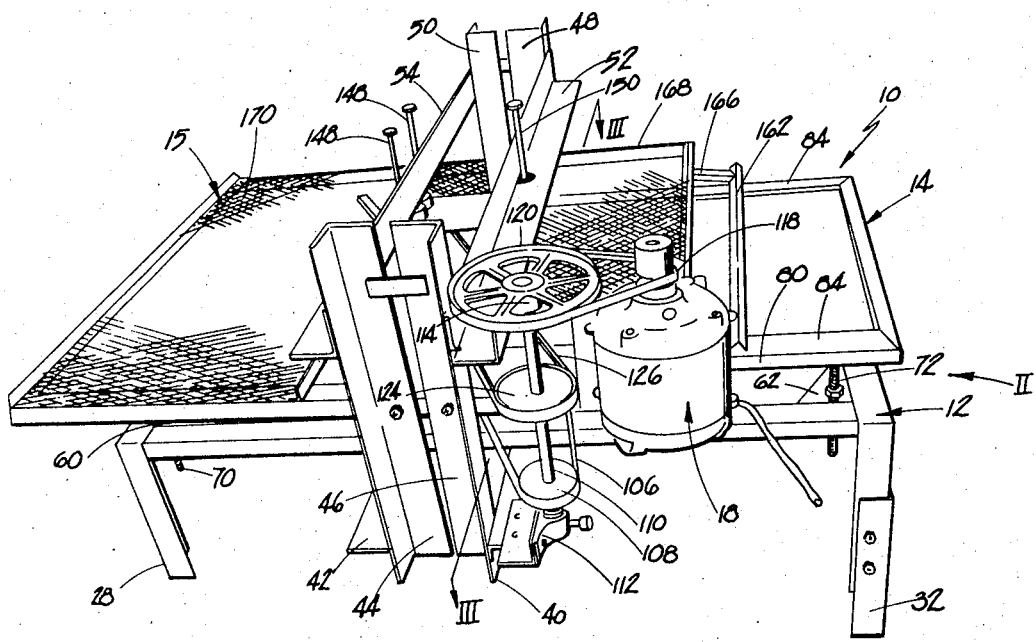
FIG 1
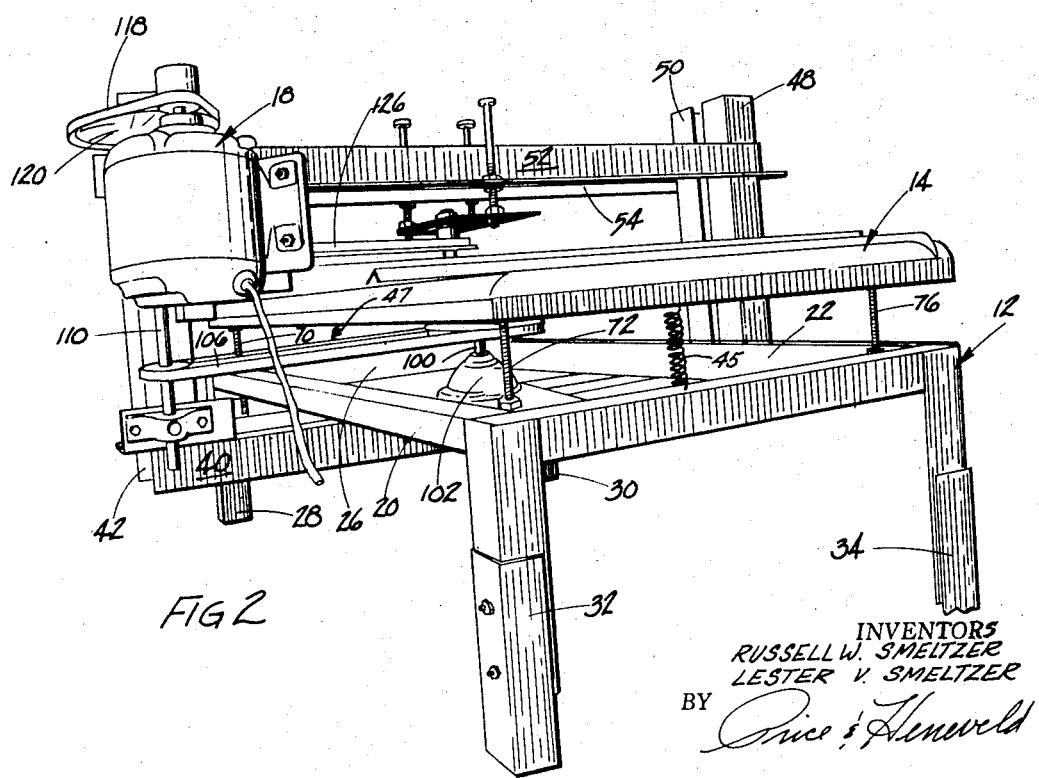
FIG 2
INVENTORS
RUSSELL W. SMELTZER
LESTER V. SMELTZER
BY
ATTORNEYS

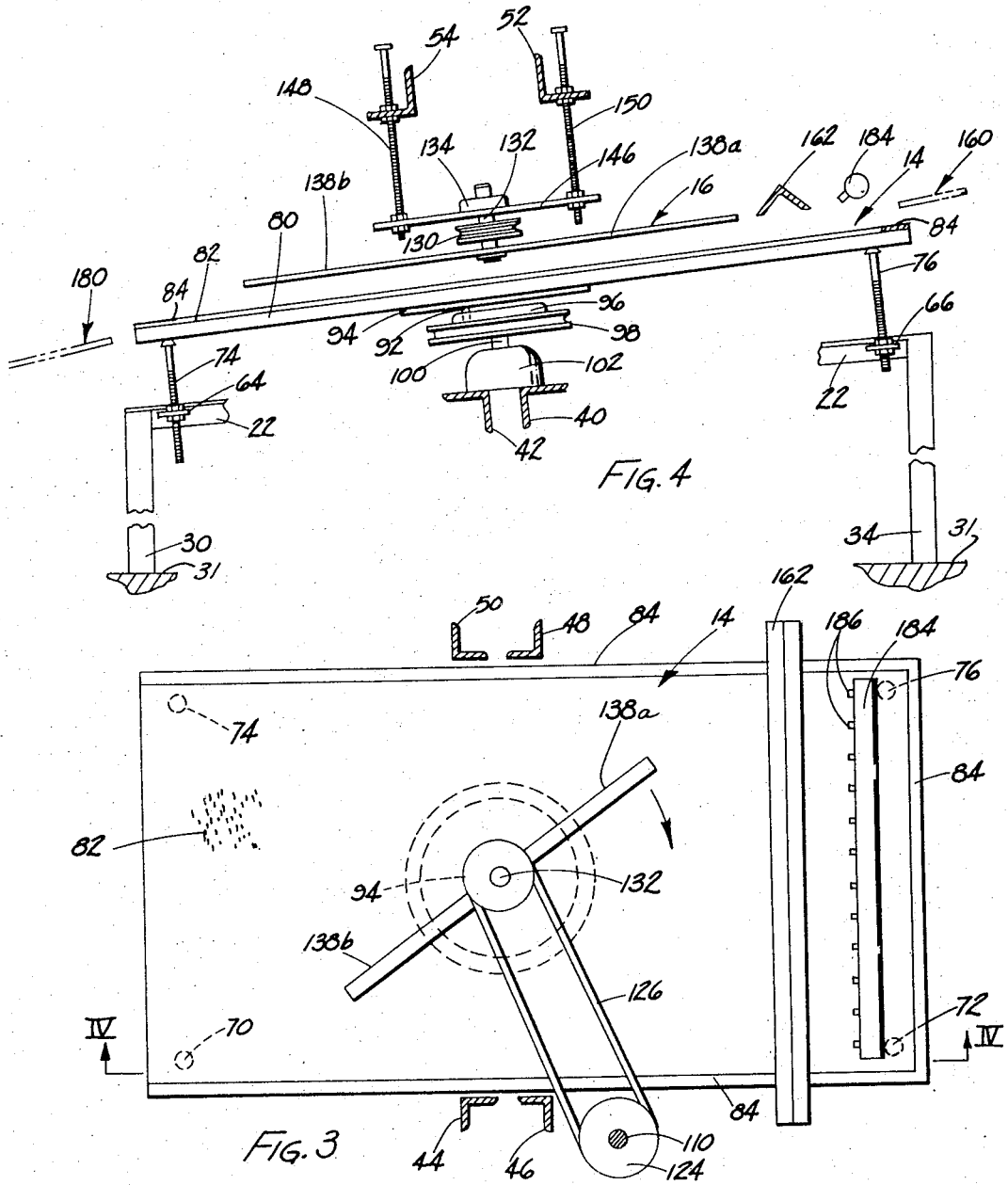

3,454,067
CHERRY STEMMING MACHINE AND METHOD
Russell W. Smeltzer and Lester Vernon Smeltzer,
Frankfort, Mich. 49635
Filed Oct. 21, 1965, Ser. No. 499,656
Int. Cl. A23n 15/02, 15/00; A23p 1/00
U.S. Cl. 146—224                                10 Claims

ABSTRACT OF THE DISCLOSURE

Cherry stemming apparatus and method functioning to pull upwardly oriented stems from cherries by thin, high speed, stem engaging and pulling elements moving, preferably rotationally, in a plane spaced above the cherry support surface an amount greater than the height of a single layer of cherries, but at stem engaging height to pull the stems of cherries specially rotated or turned upwardly by agitation of the cherry support, preferably, orbital agitation of a friction surface support, that supports and advances a single layer of cherries down a slight incline after they pass a layer regulating device.

---

This invention relates to a cherry stemming apparatus and to a cherry stemming method, and more particularly relates to unique equipment and to a method for stemming cherries in a continuous, rapid, thorough, high production manner without damaging the cherries and without requiring subsequent manual hand inspection and stemming.

When harvesting cherries, it is frequently desirable to remove the stems so that the cherries can be used directly for canning, frozen foods, or the like. However, the process of stemming cherries has always presented problems, largely because present techniques and equipment are not very efficient and not totally effective so that the process is not only slow, but subsequent hand sorting and manual stemming is also necessary. The most frequently used equipment and methods for cherry stemming utilize stem gripping and pulling principles, e.g. with counter rotating rolls, moving belts, or the like.

The inventors herein, having many years experience in the cherry raising, harvesting, and cleaning industry, and being dissatisfied with available equipment, pursued an entirely new approach to the cherry stemming problem, in efforts to effect a reliable method and apparatus which would substantially eliminate need for significant hand sorting and manual stemming subsequent to the automatic operation, eliminate significant cherry damage, obtain a high production output, and even be portable.

It is an object of this invention, therefore, to provide such a cherry stemming apparatus and method having all of these noted attributes. The novel cherry stemming machine is lightweight and portable, to be useable at any selected location, e.g. in the orchard, adjacent the orchard, in a cannery, or other place as needed.

Another object of this invention is to provide a high production cherry stemming machine that is extremely efficient and effective in removing substantially all stems, and which is regulatable to obtain optimum production output with top effectiveness for the cherries involved.

Another object of this invention is to provide a cherry stemming machine that will remove the stems at high production rates, without significant damage to the cherries themselves, yet utilizing a relatively simple but high speed apparatus. The apparatus is easy to maintain, and relatively inexpensive to construct and to operate.

Another object of this invention is to provide a novel method of rapidly, effectively, and efficiently stemming cherries, without significant damage to the cherries, with a relatively simple technique, and with only relatively small expense.

These and other objects of this invention will become apparent upon studying the following specification in conjunction with the drawings in which:

FIG. 1 is a perspective view of one side of the novel apparatus;

FIG. 2 is a perspective view of the apparatus in FIG. 1, from the direction indicated by the arrow II, showing one side and the cherry feed input end;

FIG. 3 is a sectional view of the apparatus taken on plane III—III of FIG. 1; and FIG. 4 is a side elevational fragmentary view taken on plane IV—IV of FIG. 3.

The novel apparatus and method utilize a cooperative effect between a special cherry advancing and orienting frictional surface that has a motion that effects cherry orienting with stems upwardly as well as cherry advancing, and high speed, rotating stem striking elements traveling over the level of the advancing cherries.

Referring specifically to the drawings, the complete assembly 10 includes a support stand subassembly 12, a cherry advancing and orienting subassembly 14, cherry stem striking and removal subassembly 16, and power drive subassembly 18. Preferably a safety screen and frame subassembly 15 is also provided over subassembly 16.

Framework subassembly 12 includes a substructure composed, for example, of elongated parallel angle iron beams 20 and 22, interconnected on their respective ends by a pair of angle iron transverse beams 24 and 26, to form a rectangular support frame. This subframe is mounted on a pair of short legs 28 and 30 on the one discharge end, and a pair of longer adjustable height legs 32 and 34 on the opposite input end. This subframe is positioned at a small acute angle to the horizontal plane upon which it is supported, as shown in FIG. 4. To enable the exact desired angle of subassembly 14 to be obtained without extensive adjustment of the legs 32 and 34, vertically shiftable bearing supports mounting subassembly 14 on the subframe are provided, as described more specifically hereinafter.

Extending transversely of this subframe, and secured generally to the underside of the central portions of beams 20 and 22 is a pair of underslung angle iron beams 40 and 42, on one end of which is a pair of upstanding angle iron brackets 44 and 46, and on the other end of which is a second pair of like upstanding angle iron brackets 48 and 50. Extending between the upper end portions of these brackets, and across the top of the entire assembly, is a pair of parallel angle iron beams 52 and 54.

At the four corners of the rectangular subframe is a plurality of four support plates 60 and 62 (FIG. 1), 64 and 66 (FIG. 4). Extending through orifices in these four plates are four respective, upstanding, threaded, stud type mounting elements 70, 72, 74 and 76 respectively. On the upper ends of each of these elements is an enlarged head forming a bearing surface for the underside of platform subassembly 14. Vertical threaded adjustment of these elements may be obtained with the plates to which they are mounted. They may be locked in a selected position by a pair of threadably attached lock nuts above and below the respective plates. Adjustment of the two studs 72 and 76, with respect to the two studs 70 and 74 controls the acute angular relationship of platform subassembly 14 with respect to the horibontal surface 31 upon which the entire apparatus is supported.

The four corner flat underside portions of platform subassembly 14 rest upon these upstanding bearing elements, enabling the flat platform to be slidable in both of its dimensions.

Platform subassembly 14 includes a basic flat support panel 80 such as wood, having an upper surface 82 of high frictional characteristics. Preferably, these frictional characteristics are obtained by coating the surface with a high friction material. The high friction surface which has been found to be particularly effective is that formed by distributing a thin coating of sand in a thin layer of uncured resin, curing the resin to bond the particles to the surface. Conceivably, this friction surface may be formed in various other ways, but this particular type of surface has been found to function in excellent fashion. The purpose of the surface is to cause cherries to move with high speed in its plane. The two elongated sides and the upper end input edge of this platform are bounded by a retention rim 84 to retain the cherries on the platform until they traverse the surface to the discharge end.

The acute angular relationship of this surface to the horizontal is important to the invention, and must be controlled in a manner to give optimum advancing of cherries from the upper infeed end to the lower output end, while controlling the rate of traverse of cherries across the surface in a manner to effectuate thorough stemming of the cherries before they are discharged. The small acute angle which has been found to be most effective is between about 5–7 degrees, for a platform surface coated with resin bonded sand and of a length of approximately 4 feet.

The table or platform is driven in an orbital path during operation, as indicated by the circulatory arrow in FIG. 3, to cause cherry rotation and orientation, and to cause cherry advancing. This orbital path, in the two dimensions of the platform, has been found to be important to effective operation of the apparatus. The orbital action may be obtained by an eccentric drive connection like that shown in FIG. 4. More specifically, a pin 92 projecting downwardly from a plate 94 mounted to the underside of platform 80 fits within an eccentrically located socket in a rotational hub 96. The hub rotates with drive pulley 98 on a shaft 100. The shaft is supported in thrust bearing block 102, which is supported on transverse beams 40 and 42. Thus, rotation of pulley 98 causes eccentric rotation of pin 92 to drive the platform in its orbital pattern or path at high speeds to effect agitation in the plane of the surface. Orientation of the platform is maintained by straddling brackets 44, 46, 48 and 50, and by a pair of coil spring members 45 and 47 extending between the centers of the opposite ends of the platforms and fixed elements 24 and 26. Pulley 98 is driven by a belt 106 from pulley 108. Pulley 108 is mounted on shaft 110. This shaft is journalled between a lower pillow block 112 secured to beam 40, and an upper pillow block 114 secured to beam 52. The shaft is rotationally driven by motor 18 through a belt 118 and pulley 120 mounted on the upper end of shaft 110.

This shaft 110 also drives another pulley 124 mounted thereon, to drive a belt 126 that extends around a pulley 130 on central, upper vertical shaft 132 suspended over the platform from upper thrust bearing 134. On the lower end of shaft 132 is mounted blade means which includes two or more blade elements 138a and 138b extending radially from the shaft at an elevation of approximately one and one-eighth inch above the table to be at a slight elevation above a single layer of cherries fed over the table, but at an engaging position with stems of cherries oriented stemmed upward. These blades are relatively thin to cause a stem to bend over it and be pulled as it strikes a stem, but not sharp so as to not cut through the stem even though the blades are moving at very rapid rotational rates over the width of the feed surface. Thrust bearing 154 is mounted on a horizontal support plate 146 suspended on its ends by threaded adjustment studs 148 and 150 from transverse beams 54 and 52.

Cherries are fed onto the upper input end of the platform from any suitable feed means 160 which may comprise a belt conveyor, a slanted surface, or any other.

Above the input end of the platform, transversely thereof, is an elongated cherry leveler bar 162 positioned at approximately one inch above the table, to cause the infeeding cherries to be leveled to a single layer as they pass beneath the bar and into operative engagement with the de-stemming mechanism. This bar may be supported by suitable brackets 166 connected to an elevated frame 168 that supports a safety screen 170. The screen is at an elevation above the blade means to prevent injury to personnel operating the equipment. The discharged cherries from the lower end of the platform may be received by any suitable conveying or receiving means 180.

Also extending transversely across the upper end of the platform is a water spray manifold 184 having a plurality of water outlet jets 186 directed diagonally down on the surface to wash leaves and stems from the operating surface during the de-stemming operation.

During operation, the motor causes the platform to move in its oscillatory orbital path in its two dimensions, and also drives the blade means at a high rotational rate. The cherries with stems are fed from the input means 160 onto the upper ends of the slanted platform, and are leveled to a single layer by leveling bar 162. As they traverse the length of the platform due to their rolling action down the inclined surface as it is oscillated in orbital pattern, the combination of the slanted characteristic, the high friction surface, and the oscillatory path causes them to be rotated and oriented stem upwardly temporarily in one position, and to be advanced along the length of the platform. As the stem rotates to its upstanding position, the high speed thin blades strike the stems and pull them from the cherries. The blade speed is regulated to cause the stems to be yanked without lifting the cherries, or at least without lifting them sufficiently to bring them within the path of the blade to injure them.

The following statistics are typical for an operating machine used. On a table approximately four feet long and two feet wide, the acute angle of five to seven degrees has been found to be preferred. The eccentric offset of pin 92 from shaft 100 is about one and three-eighths inches. The blades are of sufficient length to extend over the width of the surface to prevent any cherries from escaping unstemmed. The height of the blade above the surface is preferably about one and one-eight inches for the average cherries. This can of course be adjusted up or down to suit the particular size of the cherries, so that the individual cherries are not struck, but the stems are fully engaged. The rate of blade revolution is normally around 800 r.p.m., while the orbiting rate is normally around 190 r.p.m. The exact tilt of the table is regulated so that the cherries normally traverse the surface in two to four seconds, the critical factor being to increase the slant for optimum output, but keep the slant to a small enough angle so that cherries do not traverse the surface without being stemmed. The rate of water flow is about 280 gallons per hour to wash pulled stems, leaves, or dirt continuously from the surface.

These operation factors are significant; but it will be realized that with the size of the equipment, the frictional nature of the platform surface, the ripeness and moisture characteristics of the cherries may cause slight variations to obtain complete stemming and optimum production.

The apparatus and method conceived and developed by the inventors herein has created substantial interest and enthusiasm in the United States Department of Agriculture and in other institutions such as Michigan State University, because of its proven effectiveness for stemming cherries. The apparatus and method have been proven by extensive experimentation to be highly effective, highly efficient, and of low cost for stemming cherries in a reliable manner.

While the construction shown is the presently preferred form of the device, it is conceivable that the traversing surface could be other than a fixed platform while utilizing the concept employed herein. It is intended therefore that the invention, in its broadest aspects, should not be restricted to the specific construction shown, but only by the scope of the appended claims and the reasonably equivalent structures and methods to those defined therein.

We claim:

1. Cherry stemming apparatus comprising: means forming a generally flat, solid, high friction cherry supporting, orienting and advancing surface at a small acute angle from horizontal, to thereby have one edge elevated with respect to the opposite edge, said surface having a cherry receiving portion near said one edge, and said opposite edge forming a cherry discharge means; means to continuously shift said surface in both its dimensions to cause cherries thereon to be oriented stems upward, and to cause cherries to advance down across said surface in a single layer from said cherry receiving portion to said cherry discharge means; thin bladelike elements mounted to travel rapidly over said surface at a small elevation thereabove at an elevation spacing greater than the thickness of cherries to be stemmed and less than the length of cherry plus stem, to pass over cherries thereon and engage upwardly extending cherry stems; and means to drive said elements at a sufficiently high speed across said surface to pull engaged stems from cherries without lifting the cherries into said elements.

2. Cherry stemming apparatus comprising: means forming a generally flat, solid, cherry supporting, orienting, and advancing surface at a small acute angle to the horizontal to cause cherry advancement down across it; said surface having a high friction characteristic; power drive means operably connected to said means to rapidly move said high friction surface in an orbital pattern to turn the cherries stem upward as they are advanced along said surface; a plurality of thin blades mounted on a hub above said surface at an elevation above cherries on said surface and at stem engaging height; and power drive means to rotate said hub and blades at a sufficiently high speed to cause said blades to pull engaged upturned stems from the cherries without lifting the cherries into said blades.

3. The cherry stemming apparatus in claim 2 wherein said small acute angle is about 5-7 degrees.

4. The cherry stemming apparatus in claim 2 wherein cherry leveling means is provided above the upper end of the slanted surface to allow only a single layer of cherries to be fed to said surface.

5. The cherry stemming apparatus in claim 2 wherein said means forming a cherry advancing surface is a platform supported on a plurality of bearing elements and said power drive means includes a rotating eccentric connection to said platform to move it in an orbital pattern.

6. The cherry stemming apparatus in claim 2 including water jetting means across said surface and projecting down said surface to clean stems and leaves from said surface.

7. Cherry stemming apparatus comprising: means forming a destemming zone and including rotary stem pulling means rotatable in a plane; cherry supporting, advancing and orienting means positioned to advance cherries in a single layer beneath said rotary stem pulling means at a controlled spacing therefrom to cause stems on the cherries to protrude upwardly into said plane when oriented theretoward, and having cherry rotating means for causing the advancing cherries to be oriented with their stems upwardly toward said plane at some time during advancement thereof through said destemming zone.

8. A method of stemming cherries, comprising: advancing cherries containing stems along a support in a single layer; agitating cherries on said support to cause said cherries to turn stem upwardly; and moving thin stem engaging elements rapidly in a plane over said support above the level of the cherries and into engagement with the upturned stems with sufficient striking intensity to pull the stems from the cherries without lifting the cherries into said elements.

9. The method in claim 8 wherein said support is moved in an orbital path in a plane, and said thin elements are revolved above said surface.

10. A method of stemming cherries, comprising: advancing cherries containing stems in a single layer; rapidly revolving thin, stem engaging elements above the level of said cherries, at a spacing therefrom less than the length of the cherries and their stems; and rotating the individual cherries in said layer to cause stem orientation upwardly toward the blades, to cause the revolving blades to strike the upward stems intermediate the ends of the stems to pull them from the cherries.

References Cited

UNITED STATES PATENTS

| 639,152 | 12/1899 | Cox | 146—55 |
| 1,302,374 | 4/1919 | Hunsicker | 146—55 |
| 1,890,676 | 12/1932 | Fox | 146—55 |
| 1,982,142 | 11/1934 | Peterson | 146—55 |
| 2,318,805 | 5/1943 | Silva | 146—55 |

W. GRAYDON ABERCROMBIE, Primary Examiner.

U.S. Cl. X.R.

146—55, 226, 238